United States Patent
Branch

(10) Patent No.: US 7,031,836 B2
(45) Date of Patent: Apr. 18, 2006

(54) GRID MAPPING UTILITY FOR A GPS DEVICE

(75) Inventor: Charles Branch, Sunnyvale, CA (US)

(73) Assignee: Thales Navigation, Inc., Santa Clara, CA (US)

( * ) Notice: Subject to any disclaimer, the term of this patent is extended or adjusted under 35 U.S.C. 154(b) by 38 days.

(21) Appl. No.: 10/693,996

(22) Filed: Oct. 28, 2003

(65) Prior Publication Data

US 2005/0090979 A1 Apr. 28, 2005

(51) Int. Cl.
G01C 21/26 (2006.01)

(52) U.S. Cl. .................. 701/213; 701/208; 701/214
(58) Field of Classification Search ........ 701/200–219; 345/418, 419
See application file for complete search history.

(56) References Cited

U.S. PATENT DOCUMENTS 5,699,244 A * 12/1997 Clark et al. .................. 702/2
5,968,109 A * 10/1999 Israni et al. ................ 701/208
5,978,804 A * 11/1999 Dietzman .................... 707/10
6,154,699 A * 11/2000 Williams .................... 701/50
6,229,546 B1 * 5/2001 Lancaster et al. ........... 345/419

OTHER PUBLICATIONS

Thales Navigation, "Mobile Mapper" User Manual, Jul. 2003, pp. 1-120.

* cited by examiner

Primary Examiner—Richard M. Camby
(74) Attorney, Agent, or Firm—Lowe Hauptman & Berner, LLP

(57) ABSTRACT

Working with the grid mapping utility of the present invention is an easy way to log GPS positions and GIS data at waypoints arranged in an evenly spaced grid. This allows a field user to gather measurements made by field sensors such as depth sounders, chemical detectors and magnetometers. The field user can then create contour maps with the necessary density of data while avoiding any gaps that might force the field user to return to the field.

21 Claims, 5 Drawing Sheets

| Feature Type | |
|---|---|
| Name | Land#1Grid |
| Geometry | Grid |
| #of attributes | 2 |
| Number of Colum | 10 |
| Number of Rows | 10 |
| Step | 50.000000 |

*Grid properties table*

GRID MAPPING UTILITY FOR A GPS DEVICE

FIELD OF THE INVENTION

The present invention relates generally to GPS devices, and more particularly, to hand-held GPS devices using a grid.

BACKGROUND OF THE INVENTION

A hand-held GPS mapping system is a navigation and positioning device enabling the user to record both the position and descriptions of physical features being mapped. The receiver can format the data so that the data can be uploaded to a GIS. Such systems are sold by Thales Navigation and named "MobileMapper". The MobileMapper is a commercially available product made by Thales Navigation and is described in the MobileMapper User Manual published on Jul. 26, 2003, the entirety of which is hereby incorporated by reference in its entirety. Other hand-held products include Trimble's GPS Pathfinder products, Ashtech's Reliance product, and the like.

Although any of these products can record positions and physical measurements from which the user can create a contour map, only MobileMapper can currently create an orthogonal grid to streamline the collection of these positions and physical measurements. When a GPS device is used in, for example, a construction site, descriptions of the environs are often recorded at locations that are unevenly distributed. Currently, the field workers must occupy a variety of sites and record measurements made with instruments such as chemical detectors, gravimeters, magnetometers, hydrometers, etc. The aim is often to make contour maps, but not necessarily. It is very important to record a sufficient number of recordings over the entire extent of the area to be mapped. And it is important to record an even density of measurements without missing any areas and so leave gaps in the map. This can be very hard to achieve outdoors, particularly on uneven terrain or terrain with foliage and other obstructions. If the mapping density is not sufficient or if areas were missed, the project manager must send someone out to complete the mapping. This can waste a lot of time and money. Thus, a need exists for an apparatus and system that can reduce the difficulties in creating contour maps that have evenly distributed data.

SUMMARY OF THE INVENTION

These and other objects of the present invention are achieved by a method for gathering data using a handheld GPS receiver for creating a contour map including setting up a grid network comprised of navigation waypoints, recording GPS locations and descriptions of the environs at these waypoints, and uploading these locations and descriptions as GIS point features to a GIS.

The foregoing and other objects of the present invention are achieved by a method of entering parameters describing a grid network, generating the grid network on the handheld GPS device, guiding the user to each of the network's waypoints and providing a means to record GPS positions and physical descriptions at each of the grid network's waypoints.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
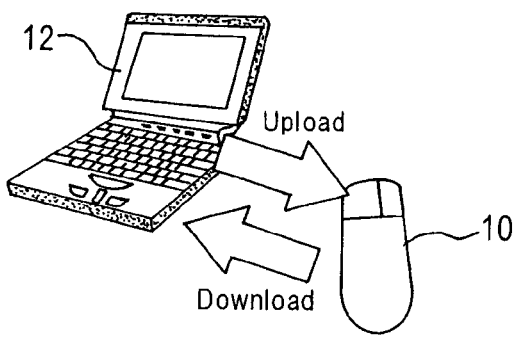
FIG. 1 is an illustration of a portable GPS device and a PC-type computer.

Working with the grid mapping utility of the present invention is an easy way to log GPS positions and GIS data at waypoints arranged in an evenly spaced grid. This allows a field user to gather measurements made by field sensors such as depth sounders, chemical detectors and magnetometers. The field user can then create contour maps with the necessary density of data while avoiding any gaps that might force the field user to return to the field.

The grid mapping utility deals with two different grid concepts: grid networks and grid waypoints. Grid networks are arrays of uniformly spaced waypoints oriented in rows and columns. Grid waypoints are navigation features similar to routes. Grid waypoints are created by MobileMapper Office software and uploaded to the receiver. The user navigates to each grid waypoint using MobileMapper and records observations or measurements using MobileMapper data logging software.

Like a point, line or area feature, a grid network is a feature geometry type. Just as a line or area feature is made of a string of point positions, a grid network is a set of grid waypoints. As with line and area features, a single feature type name corresponds to the entire grid network. In a single job, the user might record positions and descriptions of several line features classified as "roads" and two area features classified as "lakes." A grid network might be named "water depth" and one named "magnetic field."

However, line and area features differ from grid networks in two important ways. The positions making up line and area features mark the locations of real things like roads, lakes, etc. But the waypoints making up a grid network are imaginary target locations that are navigated. The attributes recorded for a road or a lake pertain equally to each of the point positions making up feature, but it is typically recorded by different descriptions at each grid waypoint making up the grid network.

A grid mapping utility assures that the field worker gathers information from an evenly distributed set of locations. This in turn assures a prescribed density of measurements (prescribed by the GIS or project manager and not by field personnel who may not be sufficiently trained or motivated to gather high-quality data on their own). Currently, the field workers must occupy a variety of sites and record measurements made with instruments such as depth sounders, chemical detectors, gravimeters, magnetometers, hydrometers, etc. The aim is often to make contour maps, but not necessarily. Is very important to record a sufficient number of recordings over the entire extent of the area to be mapped. And it is important to record an even density of measurements without missing any areas and so leave gaps in the map. This can be very hard to achieve outdoors, particularly on uneven terrain or terrain with foliage. If the mapping density is not sufficient or if areas were missed, the project manager must send someone out to complete the mapping. This can waste a lot of time and money. The grid mapping utility solves this problem.

Refer now to FIG. 1, where the Feature Library Editor is used to set up a grid network on the MobileMapper software running on a PC-type computer 12 to be uploaded to the portable GPS device 10 which can have MobileMapper installed. The computer 12 can have MobileMapper Office software installed.

New features are inserted into the Feature Library Editor Window by right clicking on the feature library name and selecting Insert Feature. A new dialog box 28 opens in which the user can define the first feature for the library. The user enters a name for this feature in the Feature Type Name field 28. The user indicates the type of the feature. For example, if the feature is a hydrant, the user checks point 25. If it is a coastline, the user checks line 24. If it is a car park, check Area. If it is an area where measurements should be performed according to a preset array of waypoints, the user checks grid 22. The user then clicks the Add button 26.

Figure 3:
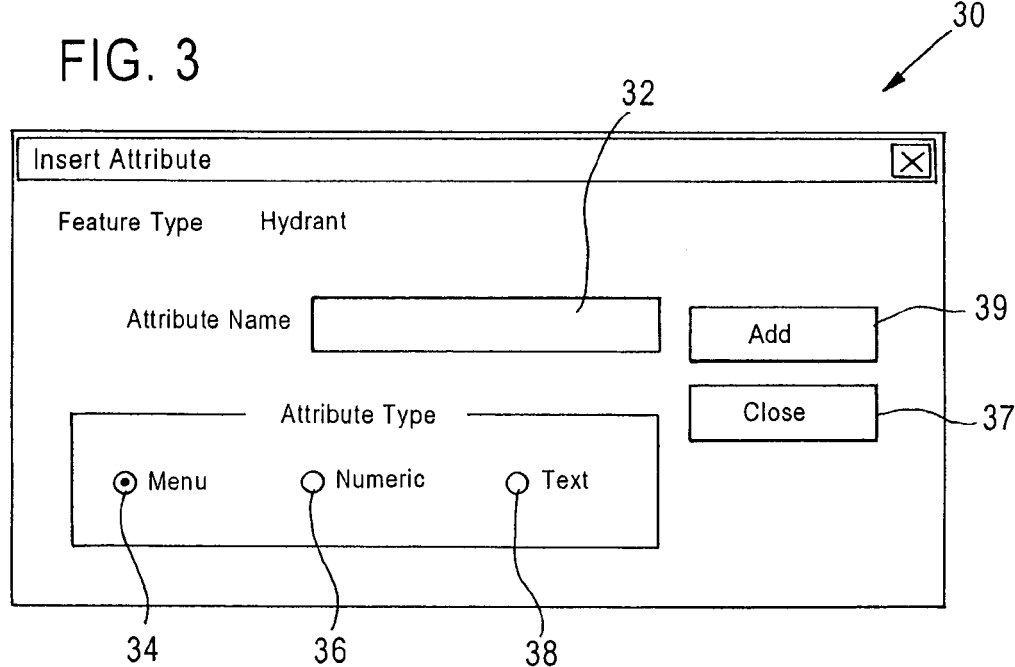
FIG. 3 is an insert attribute box.
Figure 1A:
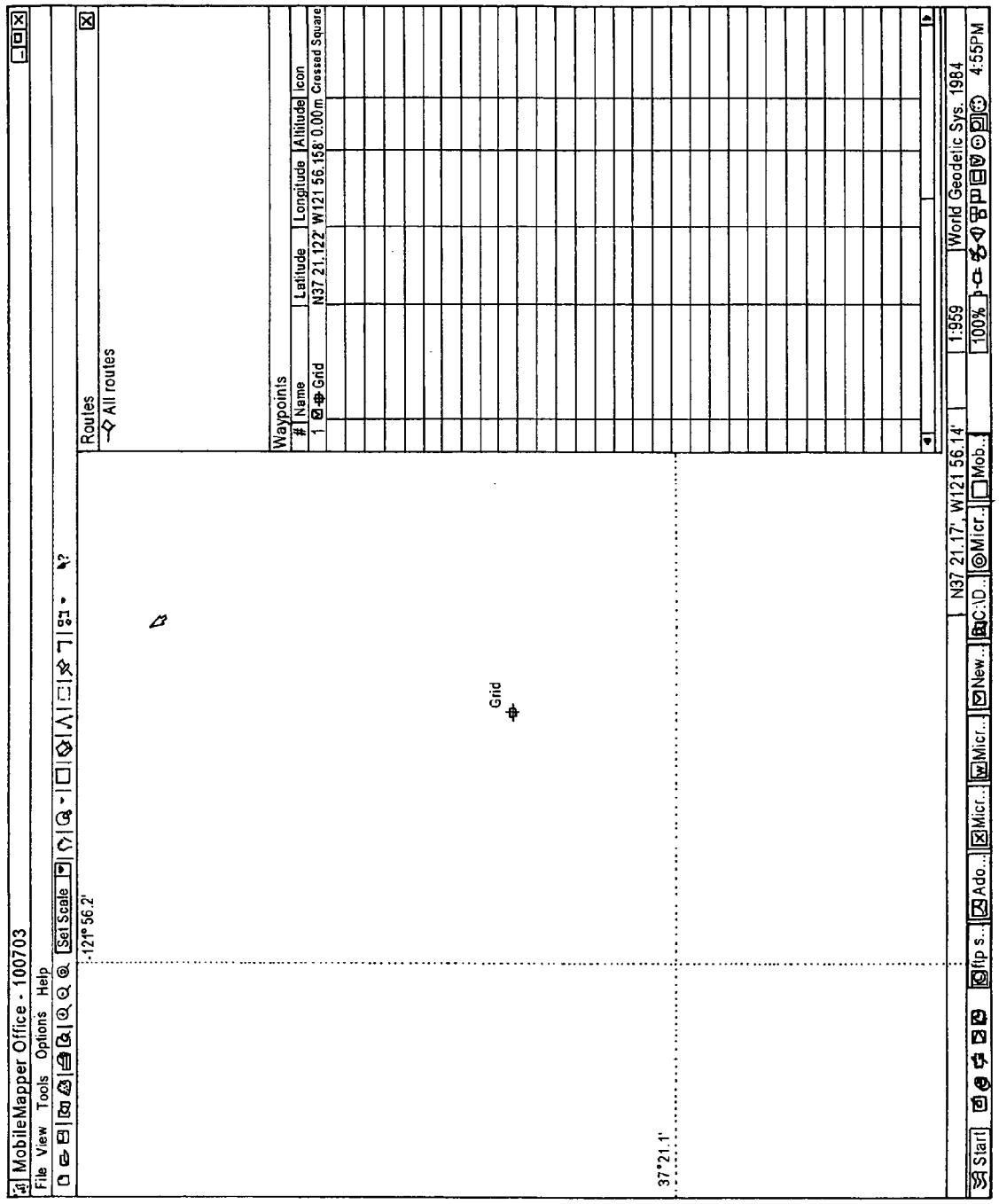
FIG. 1A is an illustration of a screen of MobileMapper Office software installed on the computer.

Under the feature library name, in the left-hand side 42 of the Feature Library Editor window (FIG. 4), the user selects the first feature name, right-clicks on it and selects Insert Attribute and a window 30 opens as depicted in FIG. 3. The user enters a name for this attribute in an Attribute Name field 32. The user then indicates the type of attribute: menu 34, numeric 36 and text 38. If the attribute consists of a list of statements that the field operator will have to choose from the user checks menu. If it refers to a number, the field operator will have to enter check Numeric. If the feature refers to a description or any other alphanumeric string that the field operator will have type in check Text. Then click Add 38 to add another attribute for the feature or Close 37 after the last attribute has been defined. Then the user clicks Add to add another attribute for the feature, or Close after the last attribute has been defined. The user selects Insert Attribute and then defines all the feature's attributes a previously explained above. The user clicks the Close button when he is done. The user repeats the steps until all the attributes have been defined for all the features present in the library.

Figure 4:
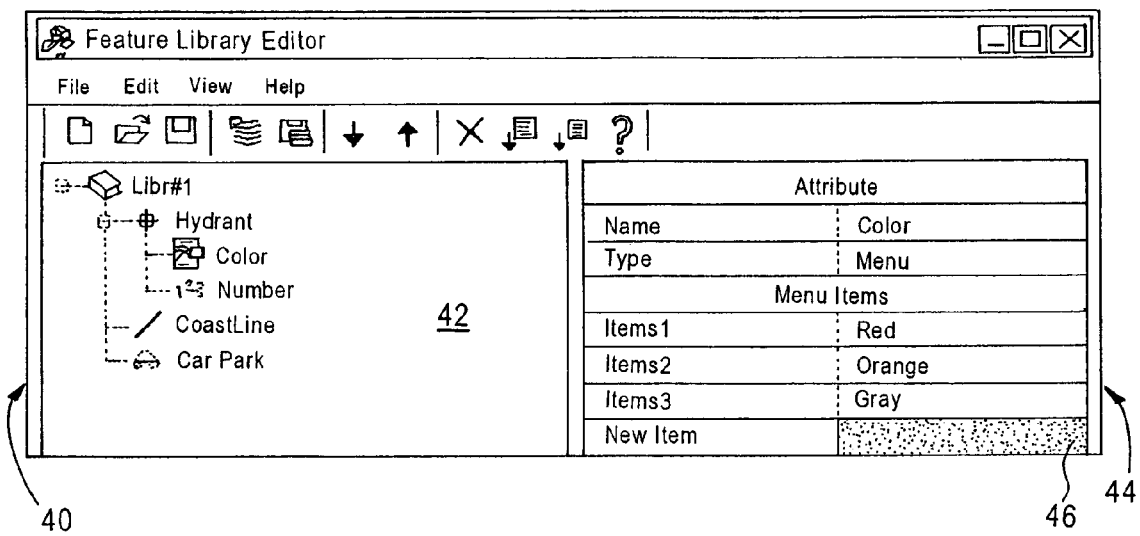
FIG. 4 is a feature library editor window showing attributes.

Attribute values are defined in the right-hand pane of the Feature Library Editor window as illustrated in FIG. 4. The user clicks on the name of the first attribute of the first feature. The right-hand pane 44 of the Feature Library Editor window 40 now shows a table containing the definition of this attribute. The highlighted cell 46 is where the user can enter the first attribute value for this attribute. The user clicks on this cell. The user types in the attribute value and the user presses ENTER on the keyboard. A new row is added in the table where the user can enter a second attribute value, etc. Examples of attribute values (red, orange, gray) for one of the attributes (color) of a point feature (hydrant) are depicted in FIG. 4. For a Menu style attribute, the user defines a list of options he will have to choose from in the field. For a Numeric style attribute, the user defines the precision, default value and range of possible values for the attribute (minimum and maximum values). For a Text style attribute, the user defines the maximum number of characters allowed and perhaps a default value for the attribute.

Figure 5:
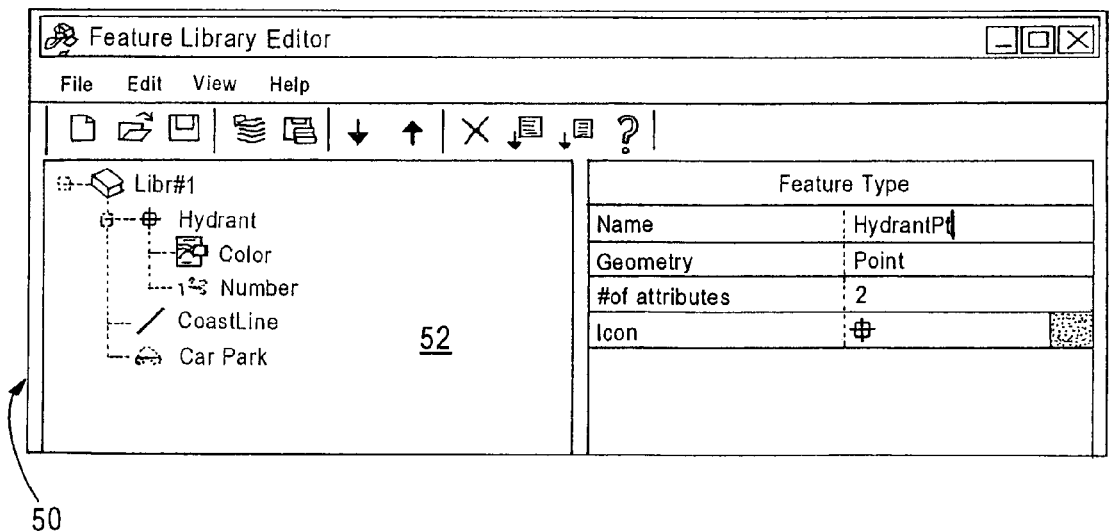
FIG. 5 is a feature library editor window showing feature types.

A feature and its representation can be redefined on the map. In the left-hand pane of the window 50 depicted in FIG. 5, the user clicks on the feature name to Edit. This displays the Feature Type table 52 on the right. The user double-clicks on the cell containing the feature name (see FIG. 5) and types in a new name. The user presses the Enter key to record the change. From the same table, the shape can be changed and aspect given to a feature on the map. The representation of a point feature on the map is an icon that the user can select in the Icon row of FIG. 6 by clicking on a particular feature. The representation of a line or area feature is based on line and fill features such as line weight, color and fill pattern.

Figure 2:
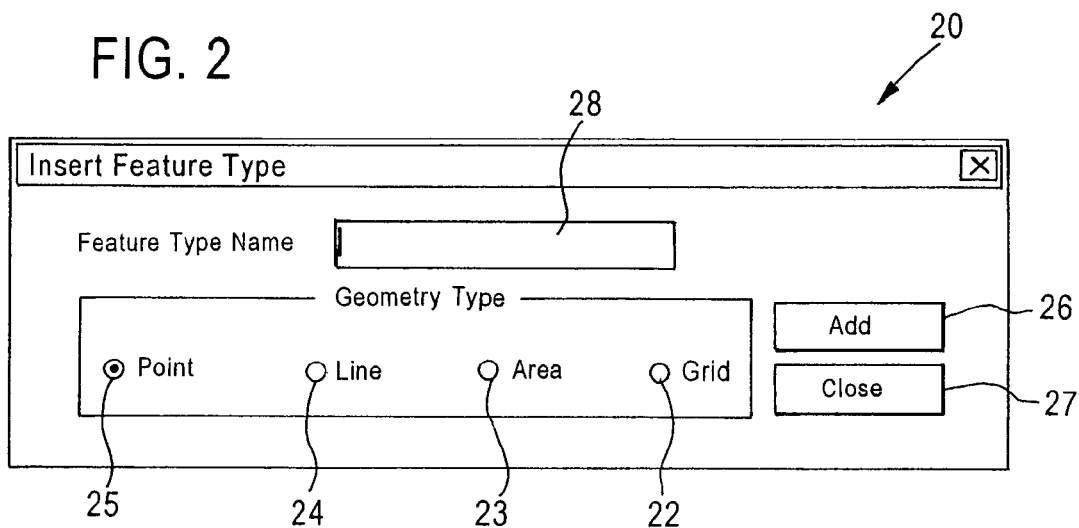
FIG. 2 is an insert feature type box.
Figures 6, 7:
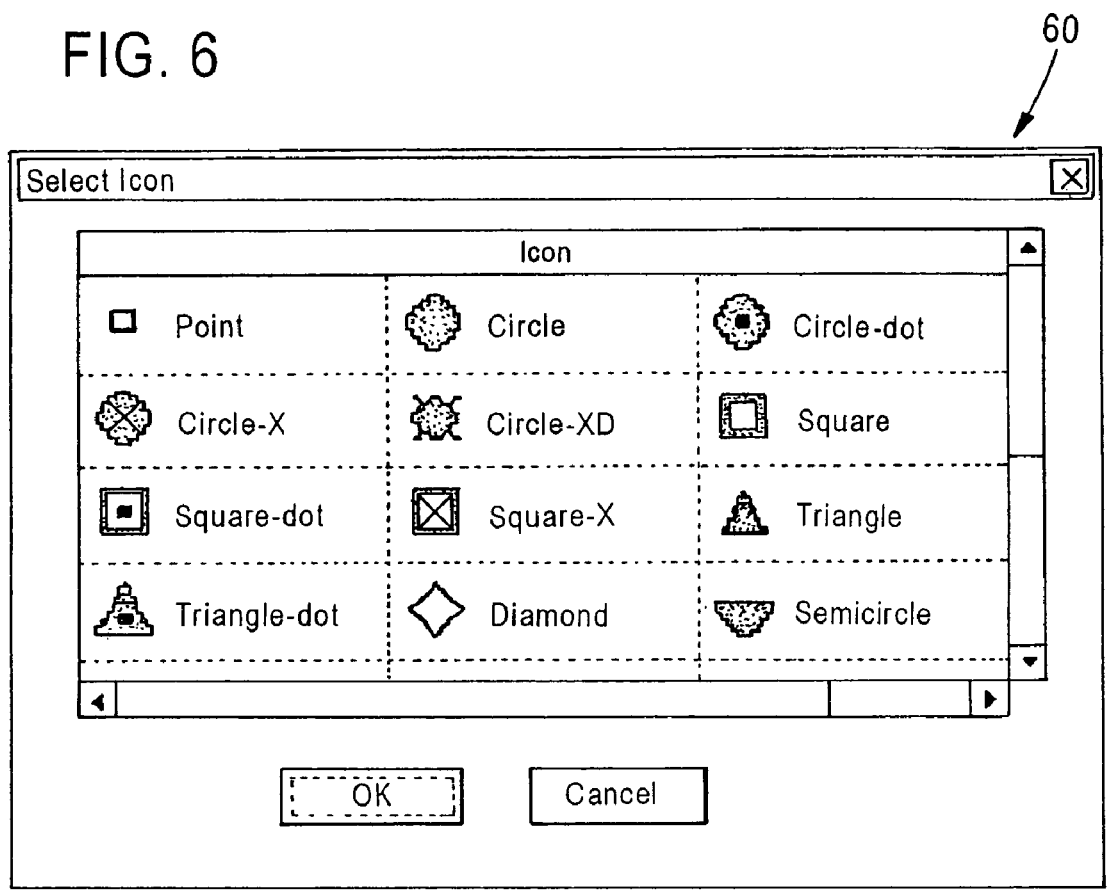
FIG. 6 is an icon window box.
FIG. 7 is a feature type attribute editor table.

To add a grid network to the feature library, the user right clicks on the name of the feature library and selects the Insert Feature Type option in MobileMapper Office on the PC-type computer 12. The feature name type is entered in a field 28 and the user selects "grid" 22 as the geometry type in the window box in FIG. 2. The user could have also selected an area 23, a line 24, and a point 25. The user could then click on an Add button 26 and then on a Close button 27. Then the user defines the attributes of the point feature that are to be recorded at each of the grid waypoints. Typically, these are text-type attributes for visual observations and numeric-type attributes for measurements made with instruments. It is also possible to record observations using a menu-type of attributes. When attributes are added to the grid network (a "feature type") the grid symbol and the name of the grid network is displayed in the tree display of the feature library. If the user right clicks on the name of the grid, two columns below labeled "Feature Type" are displayed as illustrated in FIG. 7. This is where any default values of the grid network are indicated. If the user wanted to change any of these values, he would double click on the value and type in a new one.

To add a grid feature to the feature library, the user right clicks on the name of the feature library and selects the Insert Feature option. He then selects Grid as the feature type and clicks on the Add button and then the Close button. The user can then define the attributes of the point feature that he will record at each of the grid points. Typically, these are text-type attribute values for visual observations and numeric-type attribute values for measurements made with instruments.

When the user is done adding attributes to the grid feature, he sees the grid symbol and the name of the grid feature in the tree display of the feature library. If he clicks on the name of the grid feature, he sees a two-column table on the right that is labeled "Feature Type." This is where the default values of the grid feature are indicated. If he wants to change any of these values, he double clicks on the value and types in a new one.

Figure 8:
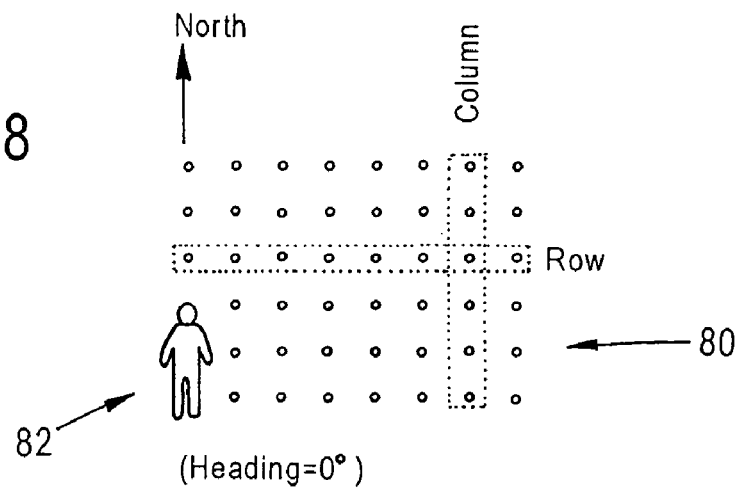
FIG. 8 is an illustration depicting a grid map according to the present invention.
Figure 9:
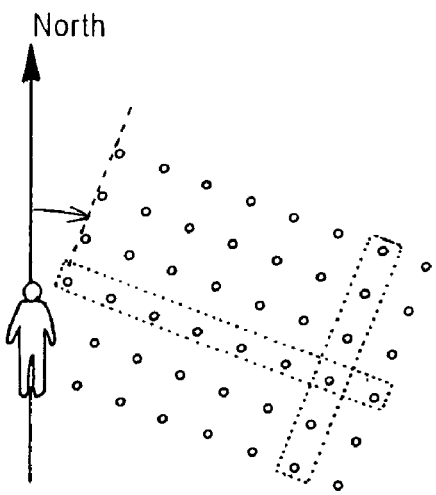
FIG. 9 is an illustration depicting a grid map with the compass direction adjusted.

To determine how large the entire grid must be, the area is measured using a base map showing an appropriate layer as illustrated in FIG. 8. A rectangle is drawn over the area to be mapped. The user measures the two sides of the rectangle in meters. Then the rectangle is divided by the grid networks spacing into a grid 80 having columns and rows. The field operator 82 is illustrated. The default heading is 0° (due North) as illustrated in FIG. 8. If the user leaves the heading at this default value, the grid network will be arrayed to the north and east of the user's position because these are the directions in front of the user and to the right. If the user wants the grid network oriented in any other direction, the user just types in the compass direction that the user will face when standing with the grid in front of the user and to the right as illustrated in FIG. 9.

Figure 10:
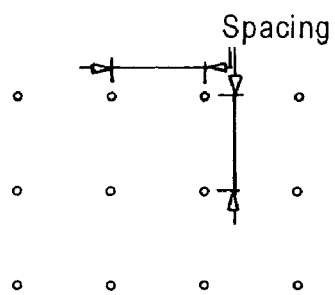
FIG. 10 is an illustration showing how spacing can be adjusted between grid points.

The default value for grid spacing parameter is 50 meters. The spacing can be set to any number of meters as illustrated in FIG. 10. This number will be automatically converted to any other distance unit set in the receiver. When changing from the default 50 meters, the selected value will determine the density of measurements. If this number is less than 5 meters or so, there is no point in using a grid feature.

The grid networks are uploaded to the receiver by uploading the feature library containing the grid network. The feature library is either uploaded as a standalone library that the user in the field can select to record a new job or MobileMapper Office is used to import the feature library into a job created in the PCT-type computer.

The field user can be told where to begin logging the grid network by creating a waypoint in MobileMapper Office by clicking on Tools>Waypoint Editor>Place Waypoints. The name should be changed from the default "WPT001" to a name telling the user that this is the point of beginning for logging a grid. Then this waypoint file should be as described of the first waypoint.

The user in the field typically makes some sort of observation or measurement at each of the grid waypoints. These may be a visual observation like "soil type" but it often will be a measurement made with some instrument at each point such as a magnetometer for magnetic field strength, an echo sounder for water depth or a picket transit for the strike and dip of rock formations.

If the user knows where the field user wants to begin logging data to the waypoints of a grid network, the user can use any of MobileMapper's navigation screens to get there. To access a waypoint file the user can use to navigate to the point of beginning, press the Menu button and select the GOTO option. Then select the Waypoint Files option. This will place the waypoint symbol and label on the base map displayed on the receiver's Map screen.

Once the user in the field arrives at the point of beginning, a job file that includes the feature library describing the grid network should be created. Alternatively, the user can select the standalone feature library to create a new job.

To record an observation or measurement with the default settings, press ENTER with the OK field highlighted. The feature-logging screen will be displayed that indicates that the receiver has begun logging data to the feature and is ready to log the feature's attributes.

When the user has finished recording the first point feature, the user can select the Next Point option at the bottom left of the screen navigate to the next grid waypoint and record the next point feature within the grid network. This takes the user to the Map screen where the current position is indicated by an arrow and the next grid waypoint is highlighted with a "crossed box" target symbol. Small red- circles indicate the locations of all the unvisited grid waypoints. The locations of where point features were recorded are indicated by small black squares.

As the field user begins moving toward the target symbol, the heading is indicated by the direction of the arrow marking your position. Movement should be adjusted as necessary until the receiver is positioned over the target symbol.

Each grid waypoint is a geographic coordinate that the user in the field should make every effort to occupy so that the data the field user records is evenly spaced and complete. However, each grid waypoint is merely an aid for navigating to the ideal location for an observation or measurement. All the data you record is ascribed to the position of the MobileMapper receiver and not of the grid waypoint.

It should be understood from the foregoing description that an easy to use method has been described in which a user using a computer can create a grid map and also set a path that a field user can follow. The (waypoints) field user can then use the uploaded grid map and waypoints to record and measure field attributes.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of recording field data by a user to facilitate the creation of a contour map using a handheld global positioning system (GPS) receiver comprising the steps of:
    setting up a grid network;
    forcing the user to enter data as GPS waypoints in the grid network;
    forcing the user to enter data as geographic information system (GIS) point feature descriptions in the grid network; and
    uploading the GPS waypoints and the GIS description to the GIS.

2. The method of claim 1, wherein the GPS waypoints and the GIS descriptions are entered in an evenly spaced grid.

3. The method of claim 1, wherein the grid network is an array of waypoints oriented in rows and columns.

4. The method of claim 1, wherein the data includes any one of visual observations and measurements made by field sensors.

5. The method of claim 4, wherein the field sensors include any one of depth sounders, chemical detectors, magnetometers, thermometers and hydrometers.

6. The method of claim 1, wherein said GPS waypoints comprise any one of a point, a line and an area.

7. The method of claim 1, wherein said GIS waypoints comprise any one of a point, a line and an area.

8. The method of claim 1, wherein said grid network is set up either on the GPS receiver or on a PC-type computer.

9. The method of claim 2, wherein said evenly spaced grid points can be adjusted in both vertical and horizontal directions.

10. The method of claim 2, further comprising adjusting said grid in size.

11. The method of claim 2, further comprising reorienting said grid.

12. The method of claim 1, comprising navigating to a first waypoint before requiring the user to enter any information.

13. The method of claim 1, wherein each of said entered GPS waypoints is assigned one or more GIS feature attributes.

14. The method of claim 1, further comprising uploading the grid network from a PC-type computer to said handheld GPS receiver.

15. A method of creating a grid map on a computer to be used by a handheld global positioning system (GPS) device, comprising steps of:
    setting up an evenly spaced grid network comprising uniformly spaced points, referred to as grid waypoints, respectively oriented in rows and columns;
    requiring entry by a user of values at said grid waypoints, referred to as point features, to be used by a user using the handheld GPS device to perform measurements or observations.

16. The method of claim 15, wherein the values include measurements made by field sensors.

17. The method of claim 16, wherein the field sensors include any one of depth sounders, chemical detectors, magnetometers, thermometers and hydrometers.

18. The method of claim 15, wherein said point features comprise any one of a point, a line and an area.

19. The method of claim 15, wherein said evenly spaced points can be adjusted in both vertical and horizontal directions.

20. The method of claim 15, comprising adjusting said grid network in size.

21. A method of entering data from a handheld global positioning system (GPS) device into an evenly spaced grid network comprising uniformly spaced points referred to as grid waypoints on the handheld GPS device, the grid network being generated on a PC-type computer, comprising the steps of:
    setting up the grid network; and
    requiring entry by a user of values at said grid waypoints, referred to as point features, to be used by a user using the handheld GPS device to perform measurements or observations.

* * * * *